United States Patent [19]

Jones, Jr. et al.

[11] Patent Number: 4,713,711

[45] Date of Patent: Dec. 15, 1987

[54] THIN FILM MAGNETIC TRANSDUCER HAVING CENTER TAPPED WINDING

[75] Inventors: Robert E. Jones, Jr., San Jose; Rodney E. Lee, Aromas; Tsu-Hsing Yeh, San Jose, all of Calif.

[73] Assignee: International Business Machines, Armonk, N.Y.

[21] Appl. No.: 731,690

[22] Filed: May 8, 1985

[51] Int. Cl.$^4$ .............................................. G11B 5/17
[52] U.S. Cl. .................................... 360/123; 360/125
[58] Field of Search .............. 360/123, 110, 125–127, 360/122, 113

[56] References Cited

U.S. PATENT DOCUMENTS 4,458,279  7/1984  Katz ..................................... 360/123

FOREIGN PATENT DOCUMENTS 0042352  3/1980  Japan ................................... 360/126
0058124  5/1981  Japan ................................... 360/126
0066522  4/1982  Japan ................................... 360/126
0128012  7/1983  Japan ................................... 360/123

*Primary Examiner*—John H. Wolff
*Assistant Examiner*—David J. Severin
*Attorney, Agent, or Firm*—Otto Schmid, Jr.

[57] ABSTRACT

A thin film magnetic transducer having a magnetic circuit having nickel-iron layers which encloses a portion of first and second windings. The portions of each winding traversing the nickel-iron layers have conductor segments equal in number and separated from each other in parallel planes. The conductor segments of each winding have a center-to-center spacing different from the remaining winding selected to avoid contact with the transition regions of the nickel-iron layers and which results in a common inductance for each winding. The windings are joined at one end to form a center tapped winding.

10 Claims, 3 Drawing Figures

THIN FILM MAGNETIC TRANSDUCER HAVING CENTER TAPPED WINDING

BACKGROUND OF THE INVENTION

The present invention relates to thin film magnetic transducers for reading and writing digital data on a magnetic disc. Specifically, a thin film magnetic transducer is described having a center tapped winding of an increased number of turns which does not limit transducer efficiency.

Data processing systems which call for additional memory capacity have correspondingly increased the data density for the system memory. In the magnetic disk art, the need for increased data density is reducing the track width for recording and reading data, thereby reducing the magnitude of signals from the transducer. An additional requirement of thinner magnetic disc media for high density memory applications will tend to reduce still further the magnitude of these signals. It is also advantageous to have the transducer write efficiently with relatively low write currents.

A solution for generating additional signal amplitude and writing with low current is to add additional turns to the winding disposed between pole pieces of a thin film transducer. The addition of more windings, however, has limitations. The transducer efficiency is controlled, in part, by the length of the region between the pole piece back gap region and pole tip region. As the distance between these two regions increases to make room for additional winding turns, a decrease in efficiency is realized.

One solution to the need for reading and writing efficiently with thin film transducers is described in the article entitled "Fabrication of Eight Turn Multi-Track Thin Film Heads", *IEEE Transactions on Magnetics*, Volume Mag. - 15 Number 6, November 1979, pages 1616 through 1618. The article describes a magnetic head which employs a plurality of windings, each stacked in parallel layers separated by a corresponding number of insulation layers. Such multiple insulation layers and conductor layers provide for steep transition regions connecting the back gap and pole tip portions of the magnetic transducers. This geometry imposes additional difficulty on conventional disposition techniques which are preferably carried out with more gently sloping transitions between the pole tip and back gap regions of the transducer element. With the structure described in this reference, the existence of numerous insulation layers poses a considerable risk of shorting between adjacent windings or between the windings and an adjacent pole piece.

In providing a magnetic transducer having additional turns, it is advantageous that a center tapped structure be provided which will permit half the turns to be used during a writing sequence, and to use all the turns in a sensing mode during a data read operation. Ideally, writing should be possible using either half of the winding in a center tapped structure, without a different drive circuit for each winding half. In order to achieve this flexibility, each winding half of a center tapped structure should have the equivalent impedance, in both inductive and resistive components.

The requirement for equal resistance between winding portions has been recognized in U.S. Pat. No. 4,318,148. The present invention seeks to provide for both an equal resistance and equal inductance for each half of a center tapped thin film magnetic transducer winding.

SUMMARY OF THE INVENTION

It is an object of this invention to provide a multiturn thin film magnetic transducer for reading and writing data on a magnetic disc.

It is a more specific object of this invention to provide a thin film magnetic transducer having an improved flux generating and sensing capability.

It is yet another object of this invention to provide a thin film transducer having a center tapped winding to permit writing and reading of information with a different number of turns.

These and other objects are accomplished by apparatus in accordance with the invention. A multiturn, thin film magnetic transducer is provided having first and second windings, the second of said windings lying in a plane spaced apart from said first winding. The individual turns of each winding have a spacing and location between two magnetic material layers which converge at two ends definining a pole tip magnetic gap transducing region and back gap structure, respectively. The average spacing of the turns of each winding with respect to the back gap structure is selected such that both windings exhibit the same inductance. The thin film transducer of the invention permits writing data with only one of the windings and reading data utilizing both windings.

In a preferred embodiment according to the invention, each winding has the same number of turns and is joined at a common connection providing a center tapped winding. The center to center spacing of the turns of the second winding is selected differently from the center to center spacing of the turns of the first winding. This permits the individual windings to be equally spaced from the pole piece transition regions which converge to form the pole tip region and back gap structure. The equally spaced windings permit the transition regions to have a lesser slope conducive to conventional deposition techniques without increasing the risks of a short circuit condition with the adjacent pole piece transition region.

DESCRIPTION OF THE PREFERRED EMBODIMENT

Figure 1:
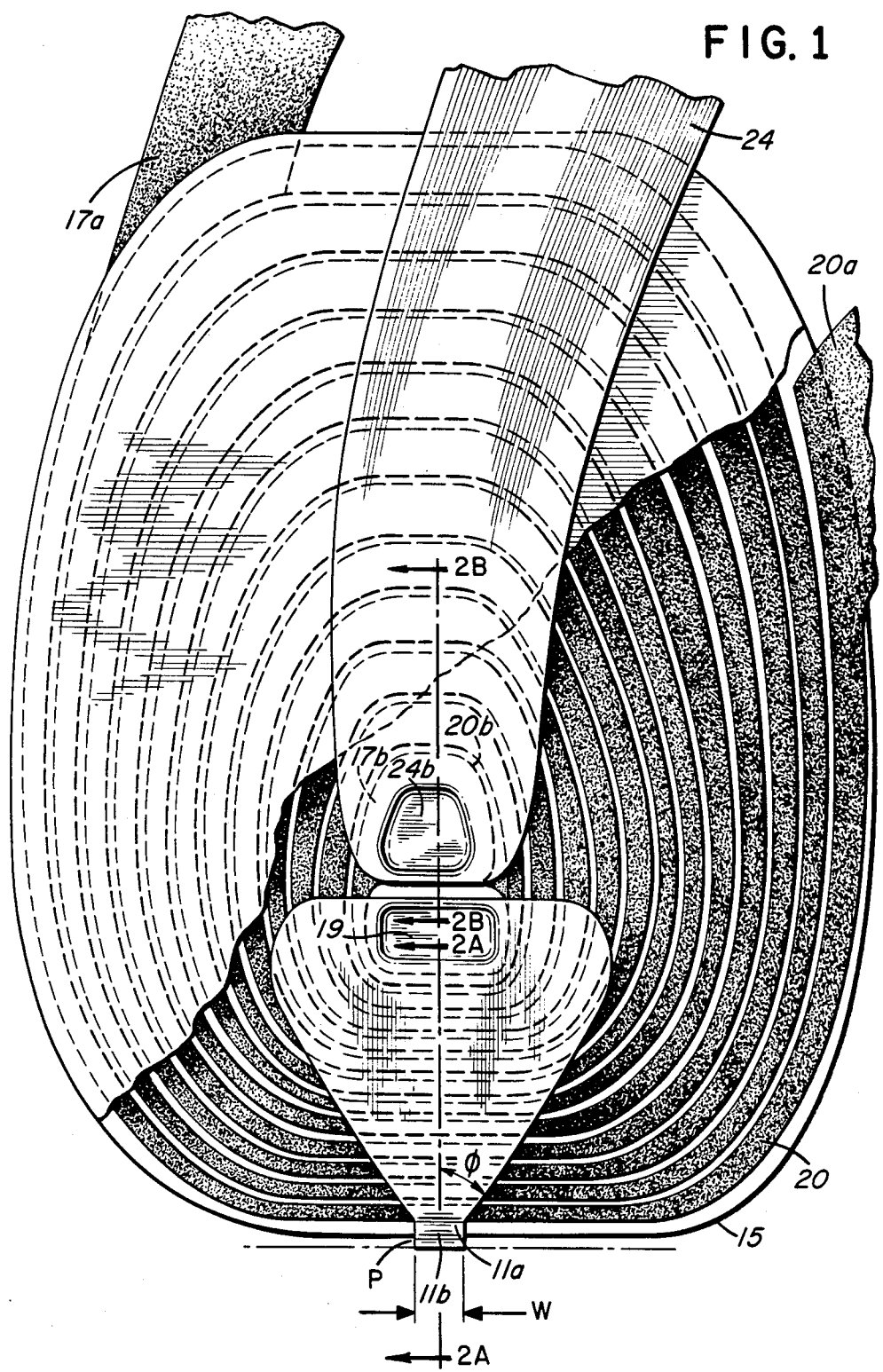
FIG. 1 illustrates a top plan view of a thin film magnetic transducer in accordance with the preferred embodiment of the invention.
Figure 2A:
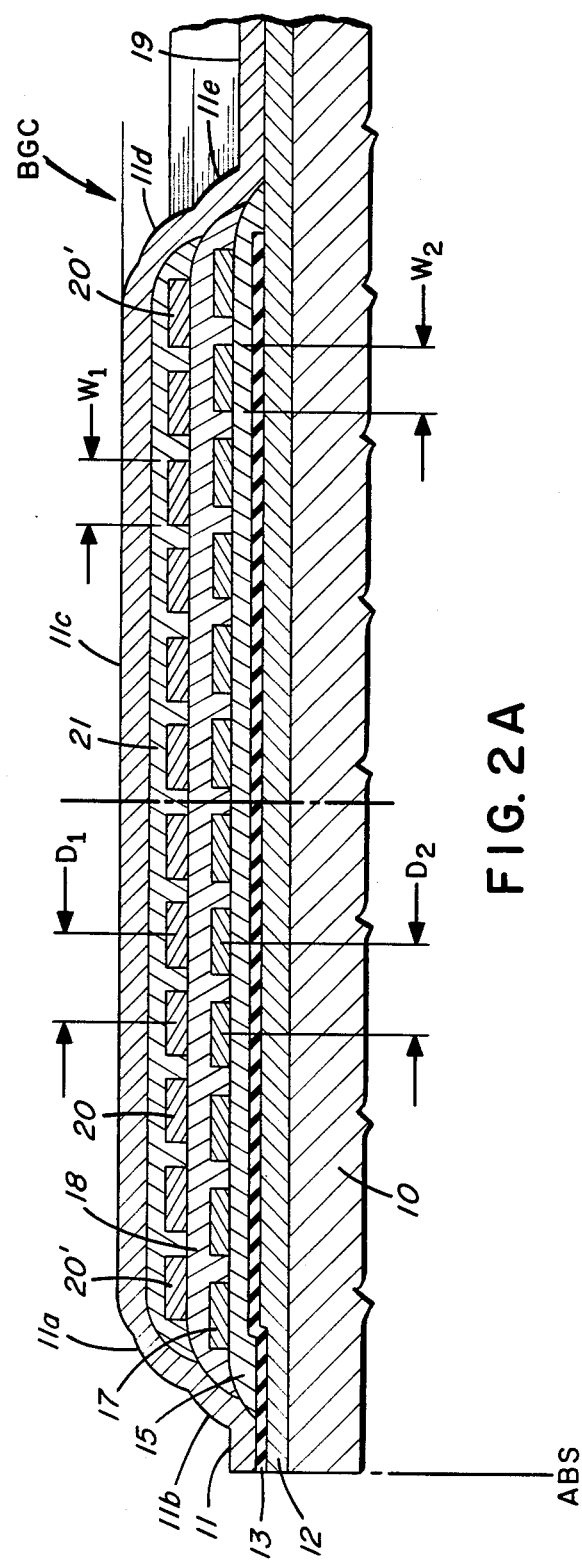
FIG. 2A illustrates a section view taken along lines 2A—2A of the transducer of FIG. 1 in the pole tip region.

Referring now, generally, to FIGS. 1 and 2A, there is shown a plan view in FIG. 1 and a cross-section taken along lines 2—2A in FIG. 2A of a thin film magnetic transducer in accordance with the present invention. The thin film magnetic transducer has a pole tip region P which abuts against an air bearing surface for reading and writing digital data on a magnetic disc carrier. The pole tip region P provides a magnetic transducing gap defined by a non-magnetic spacing layer 13 which may be an insulating material such as aluminum oxide. On either side of the non-magnetic spacing layer 13 is a first magnetic pole piece 12 and a second magnetic pole piece 11. As is known in the process of making thin film transducers, these various layers are deposited on a substrate 10, the substrate 10 generally holding a plurality of such thin film transducers made through deposition processes.

During the deposition processes of manufacturing thin film magnetic transducers, a first pole piece 12 is deposited on substrate 10. In the pole tip region P, the pole piece is seen to have a width of W which is slightly less than or equal to the width of a track of the magnetic disc carrier. The pole piece 12, generally comprising a layer of nickel-iron NiFe material, extends rearward, and beyond the pole tip region, diverges laterally at an angle $\phi$. A back gap closure 19 is positioned at the rearmost portion of the pole piece 12 which completes the magnetic circuit for pole pieces 11 and 12.

The transducer gap non-magnetic material 13 is next deposited over the entire surface of the pole piece 12 when the material 13 is an insulator, in that region between the air bearing transducing surface and the back gap closure 19 region of the thin film transducer. However, the extent of material 13 must be more closely controlled, when the material 13 is conductive, to avoid shorting the turns of the winding to be described below.

A first insulation layer 15 of baked photoresist, for instance, is deposited over the magnetic transducing gap layer 13. This layer 15 supports a plurality of segments of a single, continuous winding 17. The insulation layer 15 has in the pole tip region a generally sloping termination portion, the front edge of which defines one end of the transducer throat height. The remaining end of the throat height is defined by the air bearing surface (ABS) at the end of the pole piece. The winding 17, the first of two windings, comprises in the preferred embodiment, twelve turns which begin at an exterior connection point 17a, and continue spirally wound counter clockwise on the insulation layer 15 to a centrally located connection point 17b. The winding turns 17 which traverse the region between the pole tip and magnetic back closure area are shown to be generally transverse to the axis of the pole piece ends. Each turn or segment of winding 17 between pole pieces 11 and 12 are equally spaced, having a center line to center line spacing of D2. Additionally, each edge of the exterior segments of winding 17 in the pole tip region are spaced away from the remaining pole piece 11, such as to avoid any possible short circuit with the pole piece 11. The winding 17 can be formed by depositing an electrically conductive material such as copper.

A second insulation layer 18, which also could be of baked photoresist, is deposited over the continuous winding 17, and has at the regions of the back gap closure and pole tip region, a similarly sloping geometry. The insulation layer 18 forms a support basis for yet another twelve turn spiral winding 20 having a centrally located winding end 20b positioned over the winding end 17b, see FIG. 2B. As can be seen in FIG. 2A, winding 20 includes a plurality of spiral clockwise segments having a center line to center line spacing D1 smaller than the first winding 17. Additionally, there is a corresponding change in the width W1 of each conductor of the second winding as compared to the width W2 of each conductor of the first winding. The width W1 of the second winding is smaller than the width W2 of the first winding. The winding 20 may also be made of copper or any other electrically conductive material.

A remaining insulation layer 21 which again could be baked photoresist is deposited over the conductor winding 20, having the sloping geometry at the pole tip and back gap closure 19. The resulting pair of windings 17 and 20 each have first ends 20a and 17a which are accessible at the edge of the substrate 10 through correspondingly deposited connection portions 20a and 17a.

A final deposition process step deposits a layer 11 of NiFe material which forms the remaining pole piece for the magnetic thin film transducer. The second piece 11 includes first and second transition regions 11a and 11b at the pole piece tip region, and similar transition regions 11d and 11e at the back gap region which traverse the multiple layers of insulation and conductor windings formed in the thin film transducer. The addition of only a single twelve turn winding provides for a sloping geometry for this transition region which does not create high risks of shorting the end turns of windings 17 and 20 with the deposited pole piece transition regions 11a, 11b, 11d and 11e.

Figure 2B:
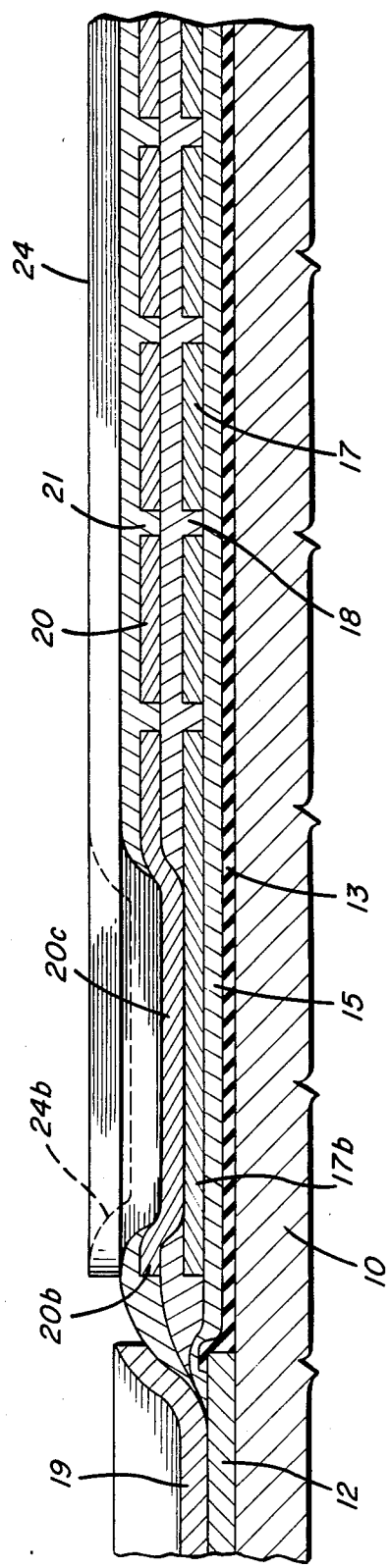
FIG. 2B illustrates another section view taken along lines 2B—2B of the region of the transducer of FIG. 1 showing the center tap connections of the thin film transducer.

The back portion of the transducer winding conductor segments which join with the conductor segments 17 and 20 in the pole tip region are shown more particularly in FIG. 2B. Rearward of the back gap closure 19 is shown a center tap connection which includes conductor ends 20b and 17b and conductor 24.

Conductor 24 is generally deposited at the same time as pole piece 11 and therefore is made of NiFe which is also an electrically conductive material. These individual conductor segments of windings 17 and 20 outside of the pole tip region are shown having a common spacing and width since the inductance of the winding is determined principally by those conductor segments of the windings in the pole tip region.

Winding end 20b includes an integral foot member 20c which is deposited to contact winding end 17b. Conductor 24 also is shown having an integral foot member 24b contacting winding end 20b. Thus, conductor 24 provides a center tap connection to the ends of windings 17 and 20. Insulation layers 15, 18 and 21 are deposited at the same time the corresponding insulation layers in the pole tip region are deposited to maintain the windings from contacting each other beyond the center tap connection.

The windings 17 and 20 provide a continuous single direction current path. Thus, on reading, the magnetic transitions on the disk are sensed by the pole pieces 11 and 12 which induce a voltage across the windings 17 and 20. This voltage can be measured at the winding ends 17a and 20a. The windings 17 and 20 are wound in the same sense, that is, as shown in FIG. 2A, the conductor coil starts at the windings end 20a, proceeds in a clockwise spiral direction through winding 20 around the back gap closure 19, ends the spiral at the conductor end 20b and continues through the integral foot member 20c into the conductor end 17b into the winding 17 which proceeds in a clockwise expanding spiral direction to the winding end 17a. It should be understood that the direction of the winding is not limiting on the present invention since the direction is arbitrary and can be considered to be counterclockwise if the direction starts at the winding end 17a with either the winding 20 being deposited on top of the winding 17 or the winding 17 being deposited on top of the winding 20. The windings 17 and 20 are wound in the same sense when the voltage induced in each are additive towards the total output voltage and not subtractive to effectively cancel the output of each.

By selecting the distances D1, D2 and widths W1, W2, in the magnetic circuit as shown in FIG. 2A, it is possible to maintain the windings from risk of electrically shorting with the pole piece layer 11. In the preferred embodiment, the center line to center line spacing D2 of the turns of winding 17 is selected to be approximately 8 microns, and the center line to center line spacing D1 of the coil member 20 is selected to be approximately 7.5 microns. The effect of the narrower spacing for conductor winding 20 is to draw the conductor 20' nearest the air bearing surface and nearest the back gap closure inward approximately 3 microns, relative to the corresponding first layer turns of winding 17. This spaces the conductor 20' nearest the air bearing surface and the back gap closure the same distance from region 11a and 11d, as the corresponding conductors of winding 17. The inductance associated with each turn of each winding is determined only by the distance of the turn from the back gap closure. Thus, by maintaining the average winding distance from the back gap closure for each of the two windings the same, the inductance of each of the coils may be maintained substantially the same. The resistance of each of the two windings can be maintained by plating thickness control during the deposition of each winding. Thus, it is possible to maintain the electrical characteristics of each winding substantially the same.

With the foregoing two-winding structure, it is possible to provide a write mode for the transducer, using one winding of twelve turns, and to read using the combination of windings for the full twenty-four turns. By utilizing a single winding for writing, it is possible to provide a low impedance drive for a write circuit. Additionally, with the inductance and resistance substantially the same in each coil structure, it is possible to select either winding for writing without any corresponding changes to the write circuit.

An additional advantage using the two-winding structure is that a differential read circuit can be employed, where the two windings are serially connected, using the center tap as a common connection, and differential measurements of flux change are made when data is read from the magnetic storage medium. There is, as is known to those skilled in the art, an improved noise rejection when making differential measurements with respect to a common connection.

Although the foregoing invention has been described with respect to two windings of twelve turns each, it is clear that the principles of the invention will apply equally well to windings of other numbers of turns. The invention provides for an increased flux without a corresponding reduction in the efficiency of the thin film transducer element which accompanies the lengthening of the distance from the pole tip to the back gap structure. The advantageous spacing of the windings of each conductor layer with respect to the remaining conductor layer permits efficiency to be maintained while avoiding any difficult steep sloping geometries apparent with multiple conductor winding structures of the prior art.

The added separation between the exterior NiFe layers of the pole pieces, as is necessary to accommodate the insulation layers and conductor winding of the additional winding, decreases the leakage between pole pieces, thus tending to concentrate the magnetic flux in the pole tip region, the region of interest. The reduction of flux leakage also improves the efficiency of the transducer.

Thus, there is described a preferred embodiment of a thin film magnetic transducer having increased reading and writing capability which may be facilitated using conventional deposition techniques.

What is claimed is:

1. A thin film magnetic transducer including
   first and second pole piece elements having a coplanar tip portion, a transition region comprising a diverging portion to define a spaced apart winding enclosure, and a back gap closure for completing a magnetic circuit;
   a first planar and continuous winding of electrically conductive material extending into said enclosure, and insulated from said pole piece elements, said first winding having a plurality of conductor segments each of a first constant spacing;
   a second continuous winding of electrically conductive material extending into said enclosure, parallel to said first winding and insulated from said first winding and from said pole piece elements, said second winding having a plurality of conductor segments of a second constant spacing; and
   said conductor segments of said first and second winding having different center to center spacings and different widths, whereby the same number of conductor segments in each of said first and said second winding may be arranged in parallel planes within said enclosure without interfering with said transition region, and whereby the electrical characteristics, comprising both resistance and inductance, of each of said first and said second winding are substantially the same.

2. The thin film magnetic transducer of claim 1 wherein the thickness of each of said plurality of conductor segments of said first winding is different from the thickness of each of said plurality conductor segments of said second winding.

3. The thin film magnetic transducer of claim 1 wherein the first of said plurality of conductor segments of each of said first and said second continuous winding is adjacent to and equally spaced from said diverging portion of said transition region.

4. The thin film magnetic transducer of claim 3 wherein the conductor segments of said winding having a larger conductor segment spacing also have a larger width than the width of the conductor segments of said remaining winding.

5. A thin film magnetic transducer for reading and writing data on a track of a magnetic disk comprising:
   a first substantially planar pole piece deposited on a substrate;
   a non-magnetic layer deposited on said pole piece defining a magnetic gap spacing;
   a first insulation layer deposited on said non-magnetic layer;
   a first multiple turn winding of electrically conductive material located on said first insulation layer; said winding having individual turns a portion of which traverse said pole piece with a common width and center to center spacing;
   a second insulation layer deposited over said first multiple turn winding;
   a second multiple turn winding of electrically conductive material located on said second insulation layer, having the same number of turns as said first winding, each of said second winding turns having a portion traversing said pole piece with a center to center spacing and width less than the spacing and width of each turn of said first winding;

a third insulation layer located on said second multiple turn winding; and a second pole piece located on said third insulation layer, said second pole piece having a sloping portion at both ends thereof, sloping towards ends of said first pole piece, said sloping regions being maintained from electrical contact with said windings by said insulative layers, one of said ends following a sloping portion overlapping said non-magnetic layer to form a magnetic gap with said first pole piece, the remaining end forming a back gap closure with said first pole piece whereby the electrical characteristics, comprising both resistance and inductance, of said first multiple turn winding and said second multiple turn winding are substantially the same.

6. The thin film magnetic transducer of claim 5 wherein each of said multiple turn windings have at least twelve (12) turns.

7. A thin film magnetic transducer comprising:
a non-magnetic portion defining a magnetic gap;
first and second pole piece layers disposed on opposite sides of said non-magnetic portion, said first pole piece layer extending away from said second pole piece layer along a first sloping region to a region substantially parallel to said second pole piece, and then sloping towards said second pole piece along a second sloping region forming a back gap structure therewith; and a flux generating and sensing circuit disposed in the area defined by said parallel region, sloping regions and second pole piece layer, said circuit comprising:

first and second independent windings of an electrically conductive material, each having a portion lying in spaced apart planes parallel to said parallel region of said pole pieces, said windings having the same number of turns, said turns having different widths and different spacings therebetween to maintain approximately the same distance from said sloping regions, said windings having substantially the same electrical characteristics in both the resistance and inductance characteristics.

8. A thin film magnetic transducer comprising:
first and second magnetic layers spaced apart from each other at one end to define a magnetic transducing gap at a pole tip portion of said transducer, said magnetic layers diverging from each other along a first transition region, and thence converging along a second transition region to a back gap closure, to thereby define a magnetic circuit;

first and second spirally wound, magnetic windings in parallel planes, separated by insulation layers to avoid contacting each other, said windings having first ends located outside of said magnetic circuit, each of said windings having the same number of turns which traverse the portion of said magnetic circuit between said transition regions, each of said windings having in said portion a different width and center to center spacing of said turns to avoid contact with said magnetic layers and to maintain the electrical characteristics, comprising both resistance and inductance, of said windings substantially the same, said windings terminating at second independent ends exterior of said magnetic layers; and connection means for connecting said first ends together forming a center tap connection for said windings whereby said windings can be connected to use either of said windings for a write operation and connected to use both of said windings for a read operation.

9. The thin film magnetic transducer of claim 8 wherein said first and second spirally wound windings are wound in the same sense.

10. The thin film magnetic transducer of claim 8 wherein each of the turns of one of said windings disposed within said magnetic circuit have an average spacing with respect to the back gap closure substantially the same as the average spacing of the turns of the other of said windings.

* * * * *